(12) United States Patent
Stern et al.

(10) Patent No.: US 11,399,129 B2
(45) Date of Patent: Jul. 26, 2022

(54) IMAGE CAPTURE DEVICE WITH EXTENDED DEPTH OF FIELD

(71) Applicant: GoPro, Inc., San Mateo, CA (US)

(72) Inventors: Jonathan Stern, San Mateo, CA (US); Adam Thomas Blumer, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/526,259

(22) Filed: Jul. 30, 2019

(65) Prior Publication Data
US 2021/0037187 A1 Feb. 4, 2021

(51) Int. Cl.
| | |
|---|---|
| *G03B 35/10* | (2021.01) |
| *G02B 7/04* | (2021.01) |
| *G06T 3/40* | (2006.01) |
| *H04N 5/232* | (2006.01) |
| *G06T 7/70* | (2017.01) |

(52) U.S. Cl.
CPC ......... *H04N 5/232125* (2018.08); *G02B 7/04* (2013.01); *G06T 3/4015* (2013.01); *G06T 7/70* (2017.01)

(58) Field of Classification Search
CPC .............. H04N 5/232125; G03B 33/00; G03B 33/08–12
See application file for complete search history.

(56) References Cited

U.S. PATENT DOCUMENTS

| | | | | |
|---|---|---|---|---|
| 7,684,687 B2* | 3/2010 | Furuya | .................... | G03B 19/07 396/88 |
| 8,326,142 B2* | 12/2012 | Kravitz | .................... | H04N 5/33 396/333 |
| 9,967,477 B2 | 5/2018 | Cao | | |
| 2005/0068454 A1* | 3/2005 | Afsenius | .............. | H04N 5/2356 348/345 |
| 2005/0140786 A1* | 6/2005 | Kaplinsky | .......... | H04N 5/23206 348/207.1 |
| 2005/0283065 A1* | 12/2005 | Babayoff | .............. | G01J 3/0205 600/407 |
| 2008/0030592 A1* | 2/2008 | Border | ............... | H04N 5/23296 348/218.1 |
| 2011/0122223 A1* | 5/2011 | Gruber | ................. | G01C 11/025 348/36 |
| 2013/0208154 A1* | 8/2013 | Wang | .................... | H04N 5/3745 348/280 |
| 2015/0358542 A1* | 12/2015 | Sato | ..................... | H04N 5/2258 348/239 |
| 2020/0166692 A1* | 5/2020 | Bastawros | ........... | G02B 5/0268 |

\* cited by examiner

*Primary Examiner* — Minh Q Phan
(74) *Attorney, Agent, or Firm* — Young Basile Hanlon & MacFarlane, P.C.

(57) ABSTRACT

An image capture device having a first integrated sensor lens assembly (ISLA), a second ISLA, and an image processor is disclosed. The first and second ISLAs may each include a respective optical element that have different depths of field. The first and second ISLAs may each include a respective image sensor configured to capture respective images. The image processor may be electrically coupled to the first ISLA and the second ISLA. The image processor may be configured to obtain a focused image based on a first image and a second image. The focused image may have an extended depth of field. The extended depth of field may be based on the depth of field of each respective optical element.

20 Claims, 10 Drawing Sheets

IMAGE CAPTURE DEVICE WITH EXTENDED DEPTH OF FIELD

TECHNICAL FIELD

This disclosure relates to enhancing depth of field in image capture devices.

BACKGROUND

Typical single lens, fixed focus image capture devices with large depths of field suffer from severe constraints in light collecting power. One way to overcome this constraint is to increase the aperture size at the cost of reducing the depth of field. Another way to overcome this constraint is to increase the sensor size at the cost of increasing the lens focal length, and again reducing the depth of field. Yet another way to overcome this constraint is to increase the aperture size with the same cost of reducing the depth of field. As a result, it would be desirable to improve the low light imaging capabilities of a single lens, fixed focus image capture device without reducing the depth of field.

SUMMARY

Disclosed herein are implementations of an image capture device having a large depth of field. In an aspect, an image capture device includes a first integrated sensor lens assembly (ISLA), a second ISLA, and an image processor. The first ISLA may include a first optical element. The first ISLA may include a first image sensor configured to capture a first image via the first optical element. The first image sensor may have a first depth of field based on a distance between the first optical element and the first image sensor. The second ISLA may include a second optical element. The second ISLA may include a second image sensor configured to capture a second image via the second optical element. The second image sensor may have a second depth of field that is based on a distance between the second optical element and the second image sensor. In some embodiments, different lenses with different optical prescriptions may be implemented such that they focus at a different object distances while maintaining the same distance between the lens and the sensor. The second depth of field may be less than the first depth of field. The image processor may be electrically coupled to the first ISLA and the second ISLA. The image processor may be configured to obtain a focused image based on the first image and the second image. The focused image may have an extended depth of field. The extended depth of field may be based on the first depth of field and the second depth of field.

In another aspect, an image capture device may include an optical element, an optical device, a first optical sensor, a second optical sensor, and an image processor. The optical device may be configured to receive an image via the optical element. The first sensor may be configured to receive the image from the optical device via a first ray path having a first optical path length. The second sensor may be configured to receive the image from the optical device via a second ray path having a second optical path length. The image processor may be electrically coupled to the first sensor and the second sensor. The image processor may be configured to obtain a focused image. The focused image may have an extended depth of field based on the first optical path length and the second optical path length.

In another aspect, an image capture device may include an optical element, a first sensor, a second sensor, and an image processor. The first sensor may be configured to receive the image from the optical element via a first ray path having a first optical path length. The second sensor may be configured to receive the image from the optical element via a second ray path having a second optical path length. The image processor may be electrically coupled to the first sensor and the second sensor. The image processor may be configured to obtain a focused image. The focused image may have an extended depth of field based on the first optical path length and the second optical path length.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
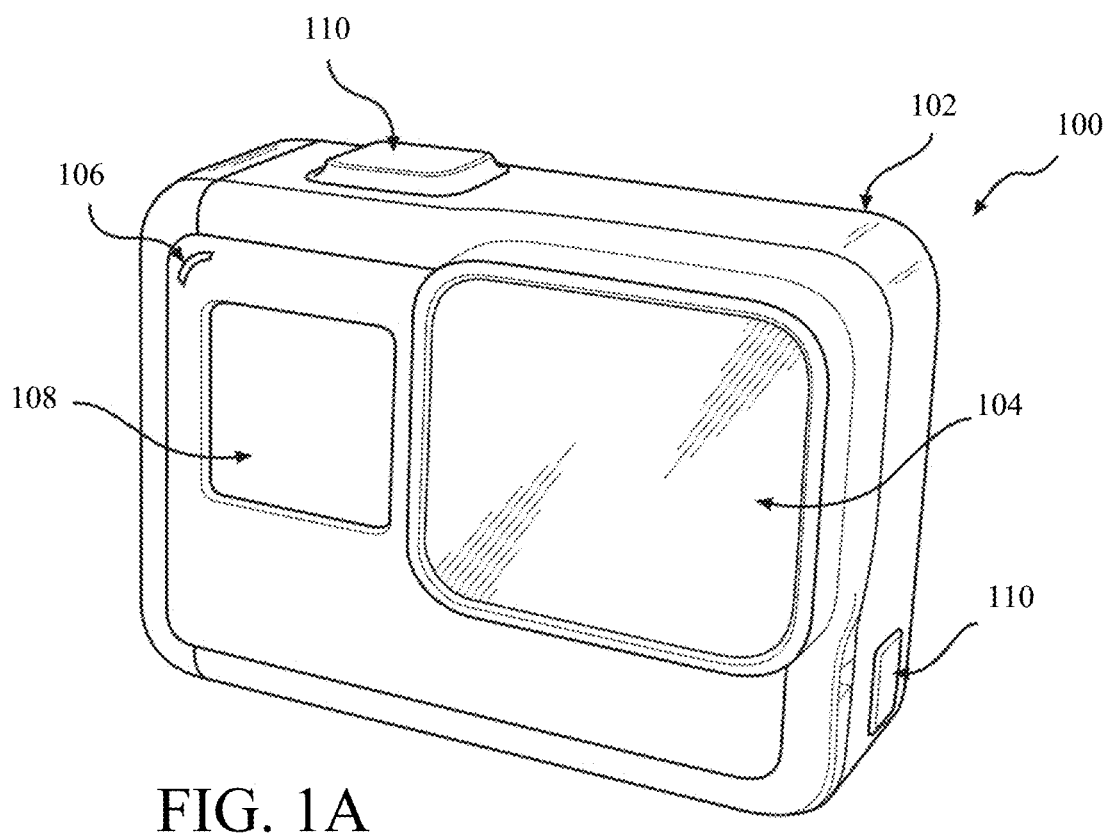
FIGS. 1A-D are isometric views of an example of an image capture device.

Implementations disclosed herein may include image capture devices with two or more lenses. The two or more lenses may have offset focal distances, and resulting images may be combined using a focused stacking computational technique to create an enhanced depth of field image or video stream. This increased depth of field may allow lenses to have a larger aperture, increase the total focus range of the image capture device, or both.

Implementations may include a prism or a beam splitter behind a lens or lens assembly to create two or more images. Implementations may include two or more sensors, each sensor having a different path length. This may allow for one or more sensors to have close objects in focus, and other sensors to have far objects in focus. The images from each sensor may be combined to increase the total depth of field. In some implementations, including a lens or group of lenses in front of the prism or beam splitter may remove the parallax between the captured images. The lenses may be focused at different object distances by having different positioning of a lens group within a lens assembly. In some implementations, one or more optical elements may be included in the ray paths between one or more sensors and the prism or beam splitter to achieve different fields of view for each sensor. The captured images may be combined to obtain optical zoom with no moving parts and no parallax.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. In some embodiments, two or more lenses may be disposed on the same side of the image capture device 100 and face the same direction (e.g., in place of the single lens 104). The two or more lenses may be arranged in a stacked configuration, arranged in a side-by-side configuration, or arranged in any suitable configuration. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
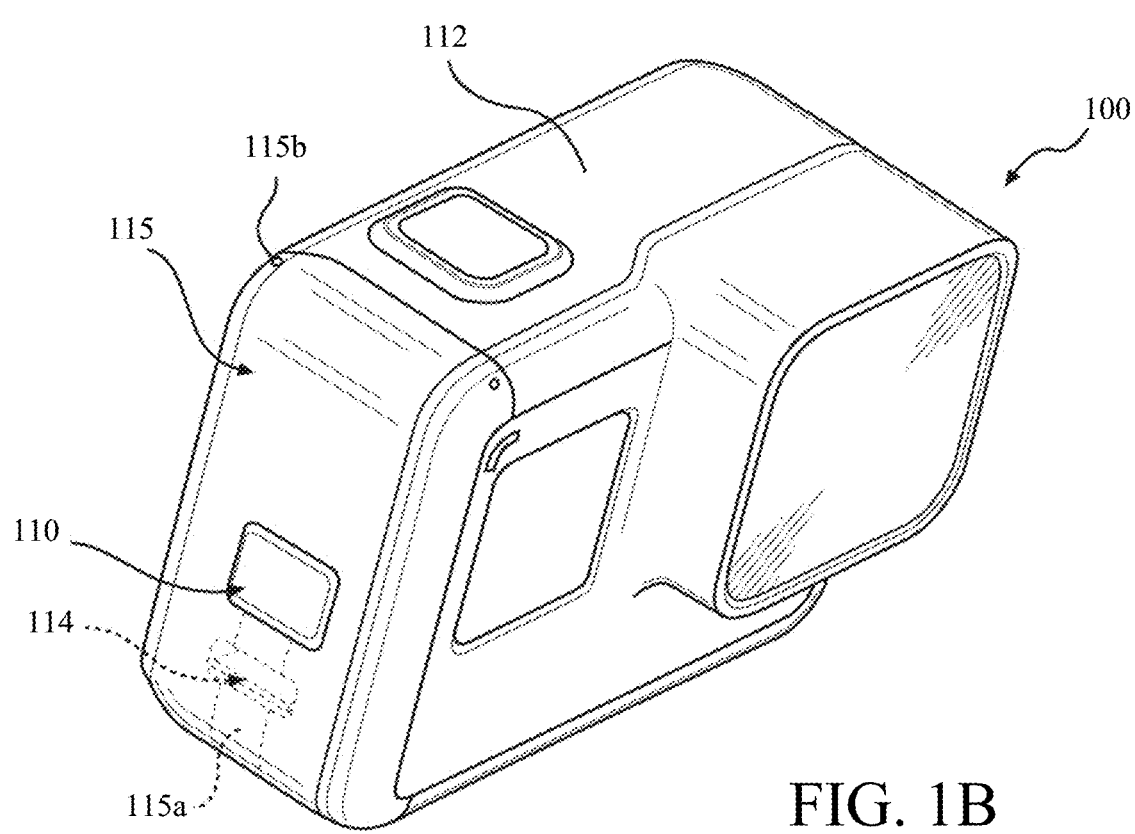
Figure 1C:
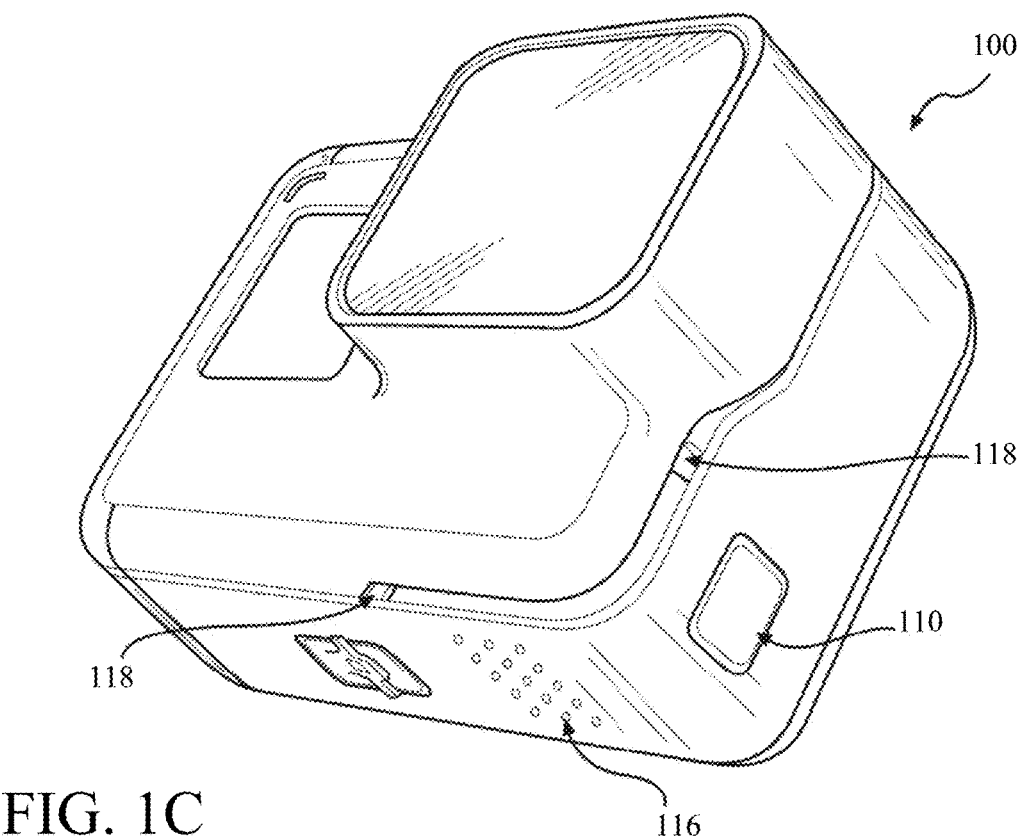
Figure 1D:
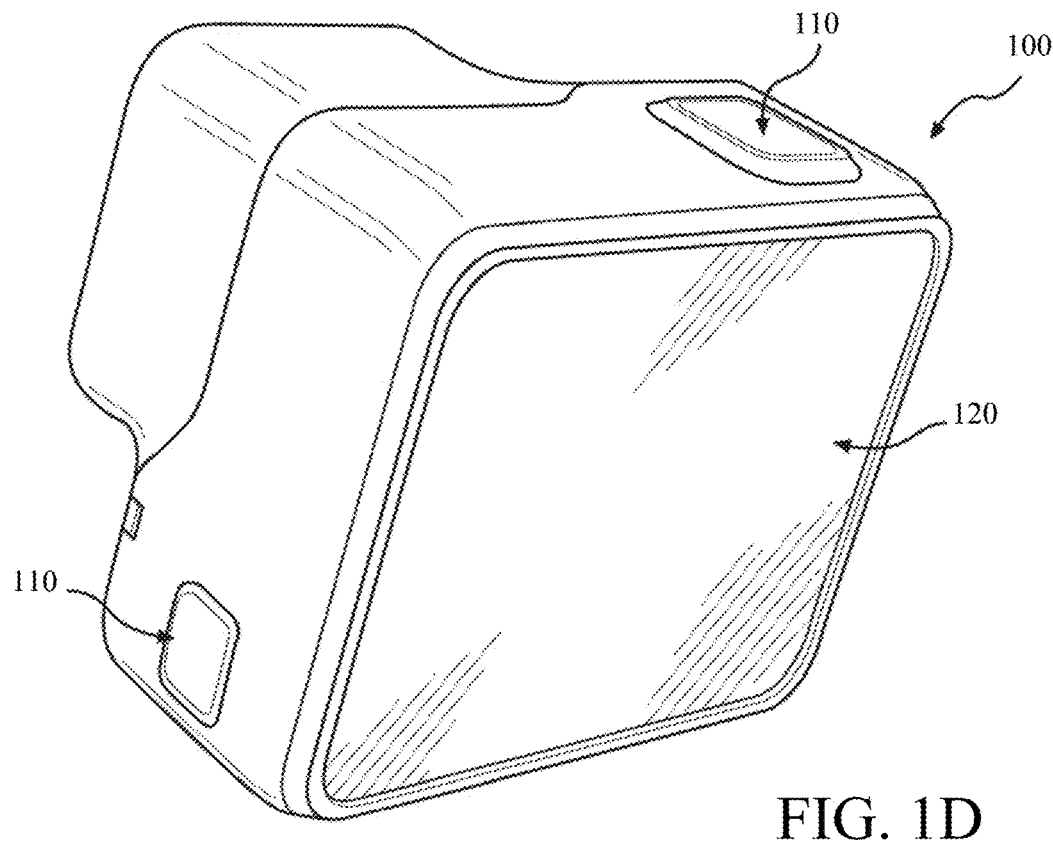

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
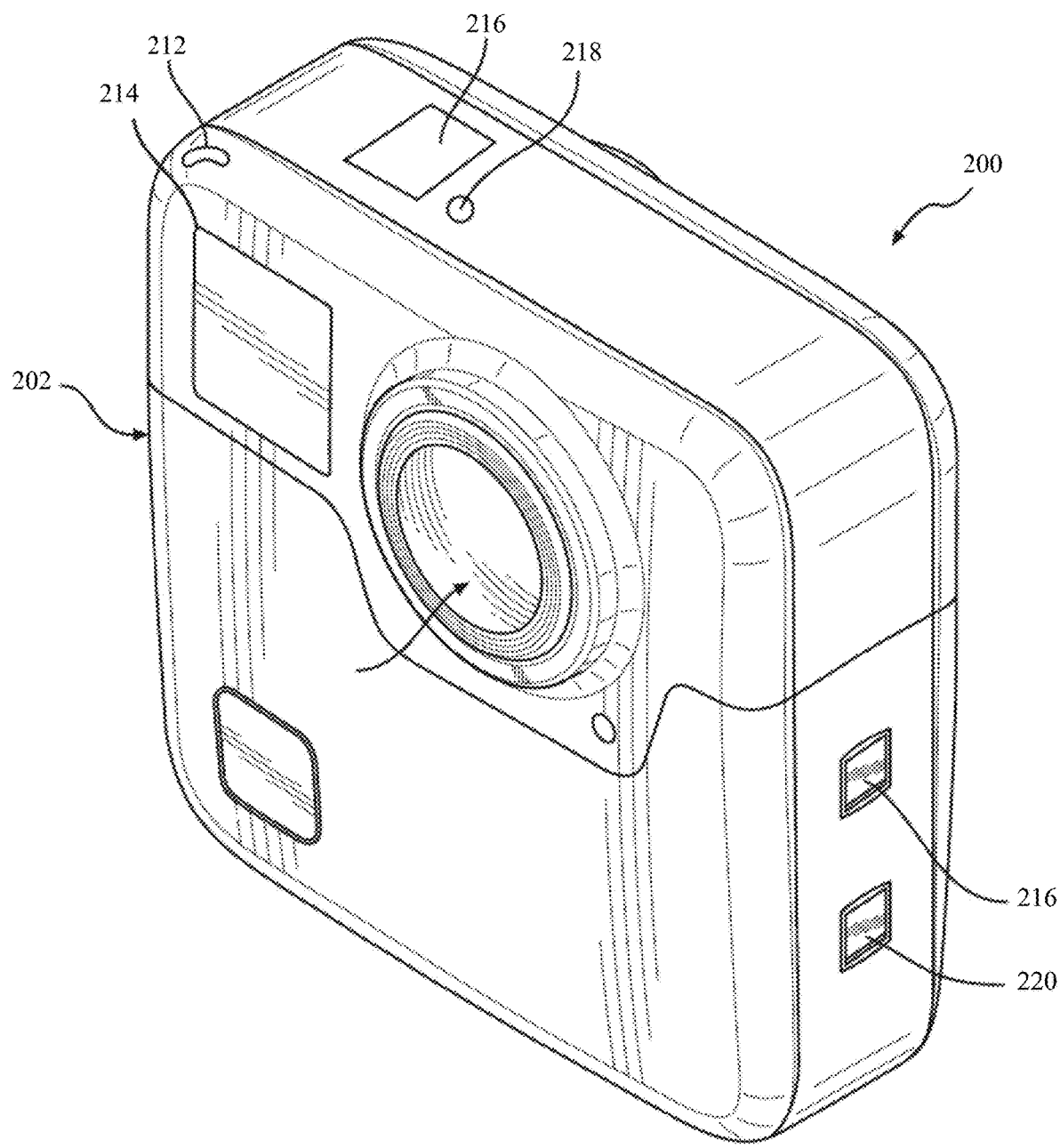
FIGS. 2A-B are isometric views of another example of an image capture device.
Figure 2B:
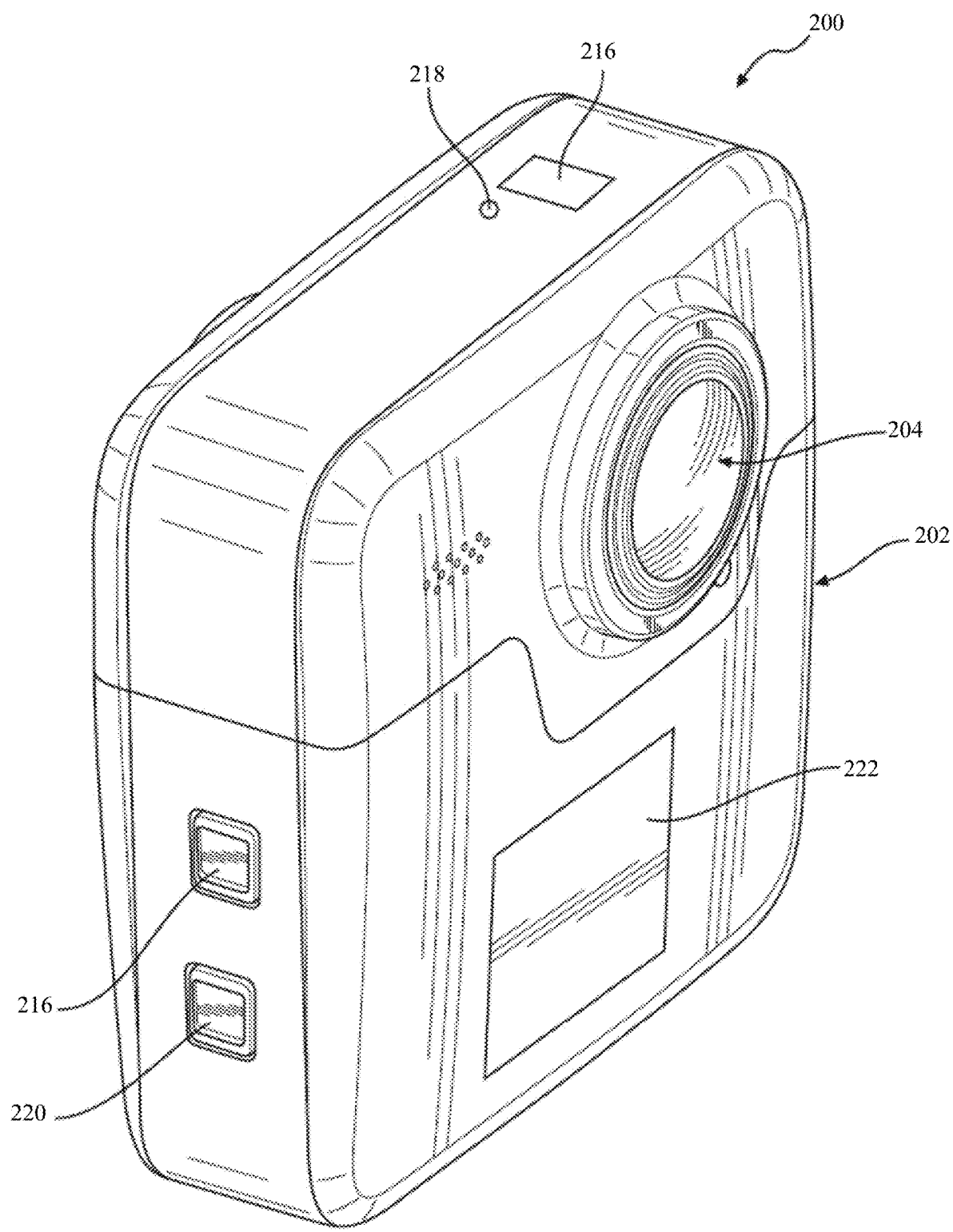

FIGS. 2A-B illustrate another example of an image capture device 200. The image capture device 200 includes a body 202 and two camera lenses 204, 206 disposed on opposing surfaces of the body 202, for example, in a back-to-back or Janus configuration. In some embodiments (not shown), the two camera lenses 204, 206 may both be disposed on the same side of the image capture device 200 and face the same direction. The lenses 204, 206 may be arranged in a stacked configuration or arranged in a side-by-side configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
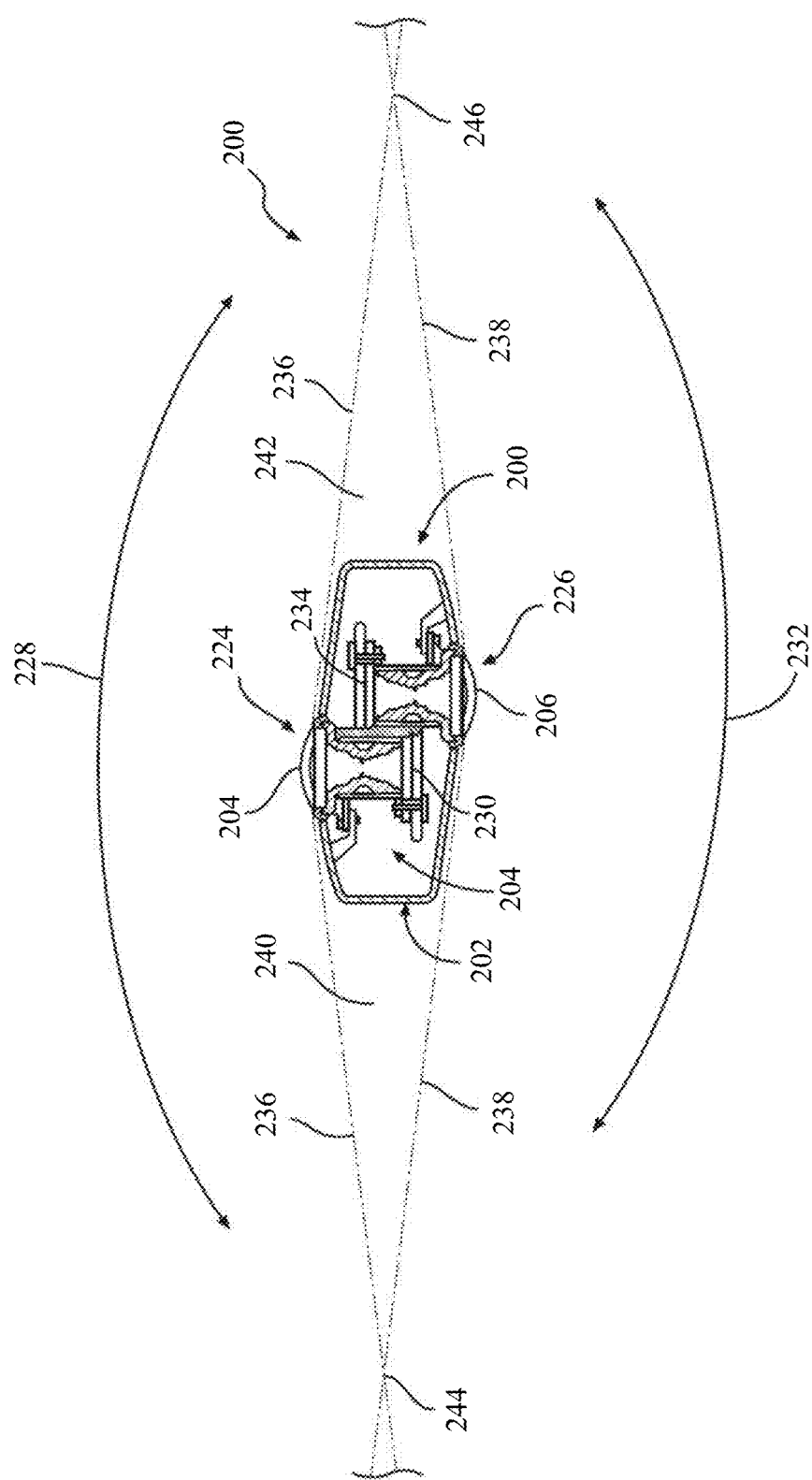
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
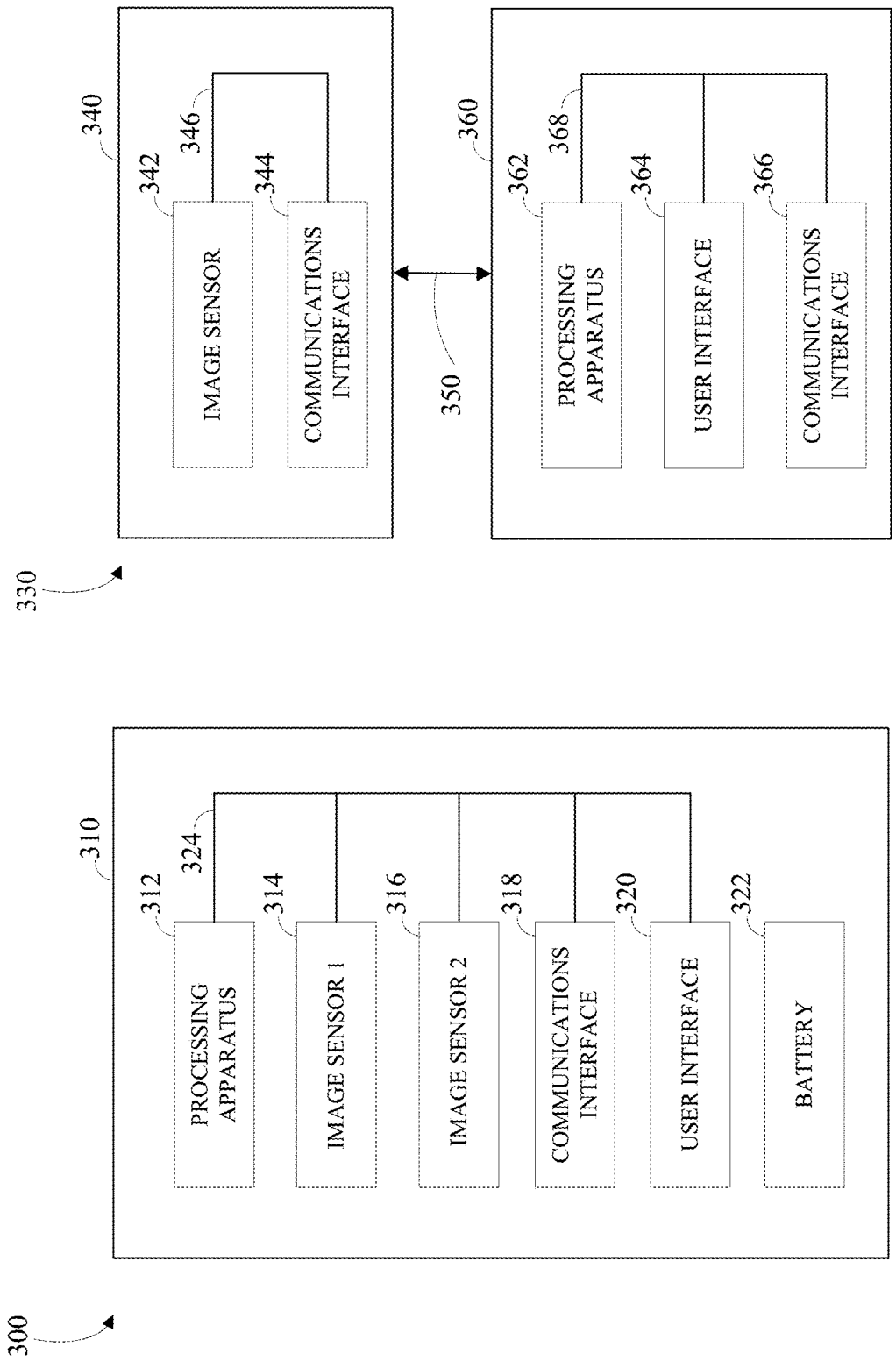
FIGS. 3A-B are block diagrams of examples of image capture systems.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

Figure 4:
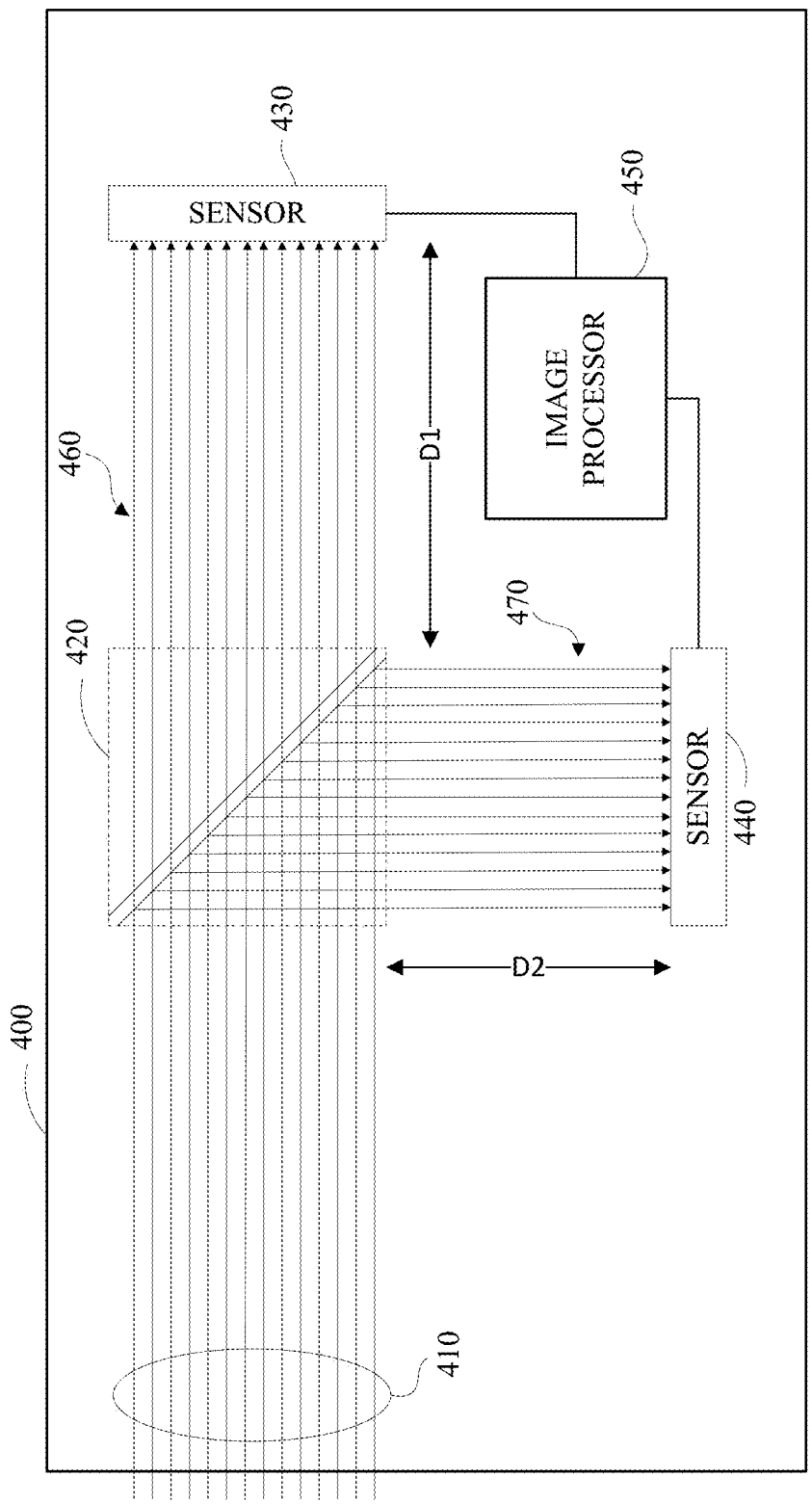
FIG. 4 is a diagram of an example of an image capture device in accordance with embodiments of this disclosure.

FIG. 4 is a diagram of an example of an image capture device 400 in accordance with embodiments of this disclosure. The image capture device 400 may be any device configured to capture photographic images, video, or both. For example, the image capture device 400 may include the image capture device 100 of FIGS. 1A-D or the image capture device 200 of FIGS. 2A-C. As shown in FIG. 4, the image capture device 400 includes an optical element 410, an optical device 420, a first sensor 430, a second sensor 440, and an image processor 450.

The optical element 410 may be any type of lens or element that is configured to receive and direct light onto one or more image sensors, for example the first sensor 430, the second sensor 440, or both. The optical element 410 may have a standard field of view, a wide-angle field of view, a fisheye field of view, or any combination thereof. The optical element 410 may be configured with an aperture of any size. For example, the optical element 410 may have an aperture of F/2.0, F/2.8, or greater.

The optical device 420 is configured to receive an image via the optical element 410. The optical device 420 may be any type of device configured to direct light onto one or more image sensors. In some implementations, the optical device may be a beam splitter or a lenticular lens. As shown in FIG. 4, the optical device 420 is shown as a beam splitter that is configured to refract the received light and create a first ray path 460 and a second ray path 470 directed to the first sensor 430 and the second sensor 440, respectively. In some implementations where the first sensor 430 and the second sensor 440 have an aligned optical axis, the optical device 420 may not be present.

The first sensor 430 may be a Bayer sensor, a monochromatic sensor, or any other type of image sensor. The second sensor 440 may be a Bayer sensor, a monochromatic sensor, or any other type of image sensor. The type of sensors may be varied based on lighting conditions. In some examples, up to a 6 dB signal-to-noise ratio (SNR) improvement may be achieved in low light image quality when compared to a single sensor image capture device. In an example where the first sensor 430 is a Bayer sensor and the second sensor 440 is a Bayer sensor, the amount of light required for image capture may be decreased by a factor of two. In an example where the first sensor 430 is a Bayer sensor and the second sensor 440 is a monochromatic sensor, the amount of light required for image capture may be decreased by a factor of 3.

As shown in FIG. 4, the first sensor 430 is configured to receive the image via the first ray path 460, and the second sensor 440 is configured to receive the image via the second ray path 470. Although the first sensor 430 and the second sensor 440 are shown at a 90 degree angle, they may be configured at any angle based on desired depths of field, constraints of the optical device 420, image capture device 400 configuration, or any combination thereof.

The depth of field of the first sensor 430 is based on the first ray path 460. The first ray path 460 has an optical path length that may be configured by adjusting the distance D1 between the first sensor 430 and the optical device 420. Accordingly, the depth of field of the first sensor 430 may be configured by increasing or decreasing the optical path length of the first ray path 460. The depth of field of the second sensor 440 is based on the second ray path 470. The second ray path 470 has an optical path length that may be configured by adjusting the distance D2 between the second sensor 440 and the optical device 420. Accordingly, the depth of field of the second sensor 440 may be configured by increasing or decreasing the optical path length of the second ray path 470. The depth of field of the first sensor 430 may overlap with the depth of field of the second sensor 440. The distance D1, the distance D2, or both, may each be adjusted to achieve any desired depth of field. In some embodiments, the optical path length of the first ray path 460 may be greater than the optical path length of the second ray path 470. In some embodiments, the optical path length of the second ray path 470 may be greater than the optical path length of the first ray path 460.

The image processor 450 is configured to receive the image from the first sensor 430 and the second sensor 440. The image processor 450 is configured to combine the image from the first sensor 430 and the image from the second sensor 440 to obtain a focused image. The focused image has an extended depth of field that is based on the first optical path length and the second optical path length. In an example where the first sensor 430 has a depth of field that is from about 0.6 m to infinity (i.e., greater than 10 m), and the second sensor 440 has a depth of field that is from about 0.4 m to about 1.0 m, the extended depth of field is from about 0.4 m to infinity.

Figure 5:
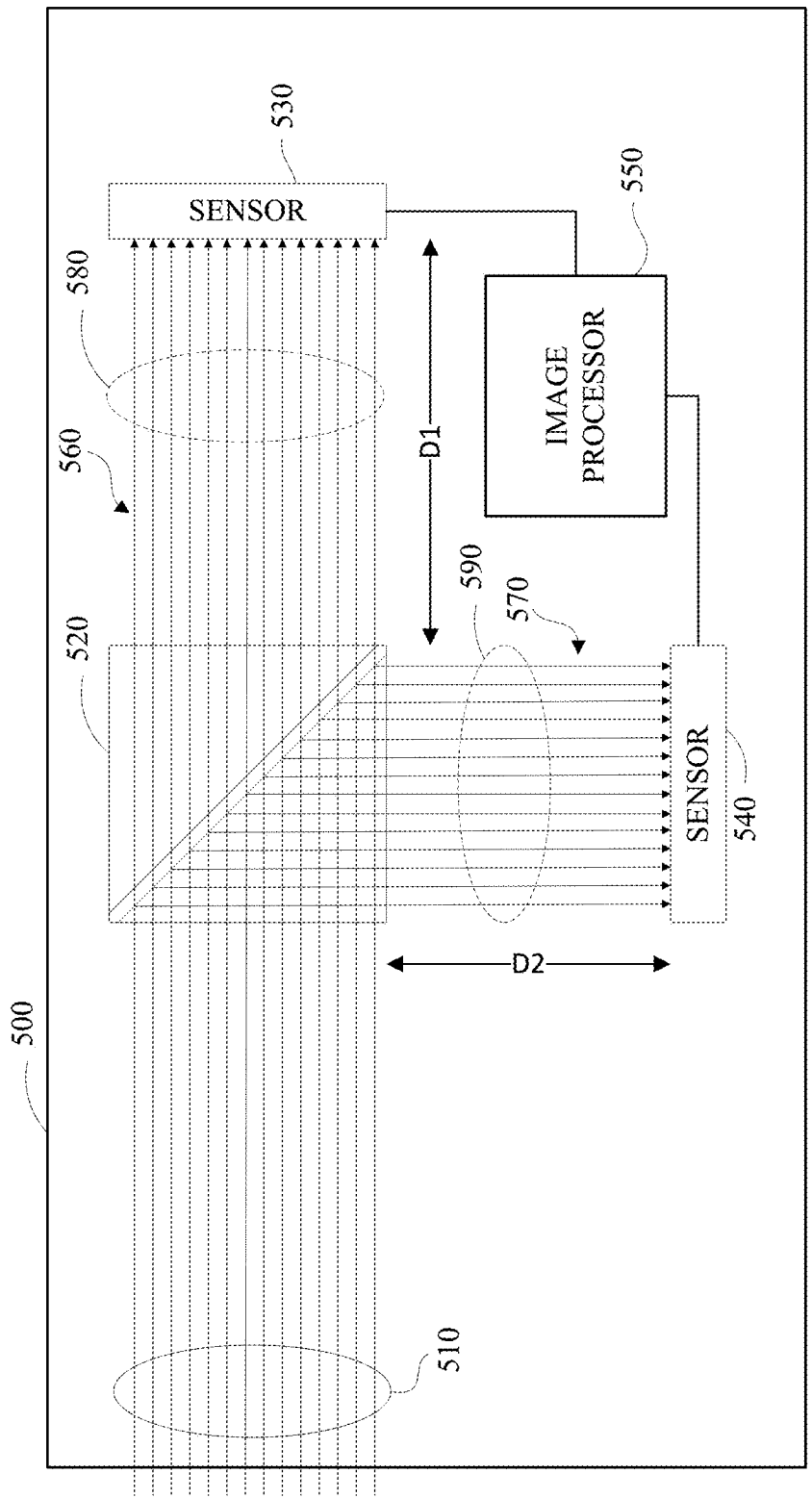
FIG. 5 is a diagram of another example of an image capture device in accordance with embodiments of this disclosure.

FIG. 5 is a diagram of another example of an image capture device 500 in accordance with embodiments of this disclosure. The image capture device 500 may be any device configured to capture photographic images, video, or both. For example, the image capture device 500 may include the image capture device 100 of FIGS. 1A-D or the image capture device 200 of FIGS. 2A-C. As shown in FIG. 5, the image capture device 500 includes an optical element 510, an optical device 520, a first sensor 530, a second sensor 540, and an image processor 550.

The optical element 510 may be any type of lens or element that is configured to receive and direct light onto one or more image sensors, for example the first sensor 530, the second sensor 540, or both. The optical element 510 may have a standard field of view, a wide-angle field of view, a fisheye field of view, or any combination thereof. The optical element 510 may be configured with an aperture of any size. For example, the optical element 510 may have an aperture of F/2.0, F/2.8, or greater.

The optical device 520 is configured to receive an image via the optical element 510. The optical device 520 may be any type of device configured to direct light onto one or more image sensors. In some implementations, the optical device may be a beam splitter or a lenticular lens. As shown in FIG. 5, the optical device 520 is shown as a beam splitter that is configured to refract the received light and create a first ray path 560 and a second ray path 570 directed to the first sensor 530 and the second sensor 540, respectively.

The first sensor 530 may be a Bayer sensor, a monochromatic sensor, or any other type of image sensor. The second sensor 540 may be a Bayer sensor, a monochromatic sensor, or any other type of image sensor. The type of sensors may be varied based on lighting conditions. In some examples, up to a 6 dB SNR improvement may be achieved in low light image quality when compared to a single sensor image capture device. In an example where the first sensor 530 is a Bayer sensor and the second sensor 540 is a Bayer sensor, the amount of light required for image capture may be decreased by a factor of two. In an example where the first sensor 530 is a Bayer sensor and the second sensor 540 is a monochromatic sensor, the amount of light required for image capture may be decreased by a factor of 3.

As shown in FIG. 5, the first sensor 530 is configured to receive the image via the first ray path 560, and the second sensor 540 is configured to receive the image via the second ray path 570. Although the first sensor 530 and the second sensor 540 are shown at a 90 degree angle relative to the optical device 520, they may be configured at any angle relative to the optical device 520 based on desired depths of field, constraints of the optical device 520, image capture device 500 configuration, or any combination thereof.

The depth of field of the first sensor 530 is based on the first ray path 560. The first ray path 560 has an optical path length that may be configured by adjusting the distance D1 between the first sensor 530 and the optical device 520. Accordingly, the depth of field of the first sensor 530 may be configured by increasing or decreasing the optical path length of the first ray path 560. The depth of field of the second sensor 540 is based on the second ray path 570. The second ray path 570 has an optical path length that may be configured by adjusting the distance D2 between the second sensor 540 and the optical device 520. Accordingly, the depth of field of the second sensor 540 may be configured by increasing or decreasing the optical path length of the second ray path 570. The depth of field of the first sensor 530 may overlap with the depth of field of the second sensor 540. The distance D1, the distance D2, or both, may each be adjusted to achieve any desired depth of field. In some embodiments, the optical path length of the first ray path 560 may be greater than the optical path length of the second ray path 570. In some embodiments, the optical path length of the second ray path 570 may be greater than the optical path length of the first ray path 560.

The image processor 550 is configured to receive the image from the first sensor 530 and the second sensor 540. The image processor 550 is configured to combine the image from the first sensor 530 and the image from the second sensor 540 to obtain a focused image. The focused image has an extended depth of field that is based on the first optical path length and the second optical path length. In an example where the first sensor 530 has a depth of field that is from about 0.6 m to infinity (i.e., greater than 10 m), and the second sensor 540 has a depth of field that is from about 0.4 m to about 1.0 m, the extended depth of field is from about 0.4 m to infinity.

The image capture device 500 shown in FIG. 5 may include one or more optical elements between the optical device 520 and the first sensor 530, one or more optical elements between the optical device 520 and the second sensor 540, or both. The example shown in FIG. 5 includes an optical element 580 in the first ray path 560 between the optical device 520 and the first sensor 530. The optical element 580 may be any type of lens or element that is configured to receive and direct light onto the first sensor 530. The optical element 580 may be positioned at any point between the optical device 520 and the first sensor 530. The optical element 580 may be configured to adjust any optical property, for example field of view, zoom, or lens F number (F/#). The example shown in FIG. 5 may also include an optical element 590 in the second ray path 570 between the optical device 520 and the second sensor 540. The optical element 590 may be any type of lens or element that is configured to receive and direct light onto the second sensor 540. The optical element 590 may be positioned at any point between the optical device 520 and the second sensor 540.

The optical element 590 may be configured to adjust any optical property, for example field of view, zoom, or lens F/#.

Figure 6:
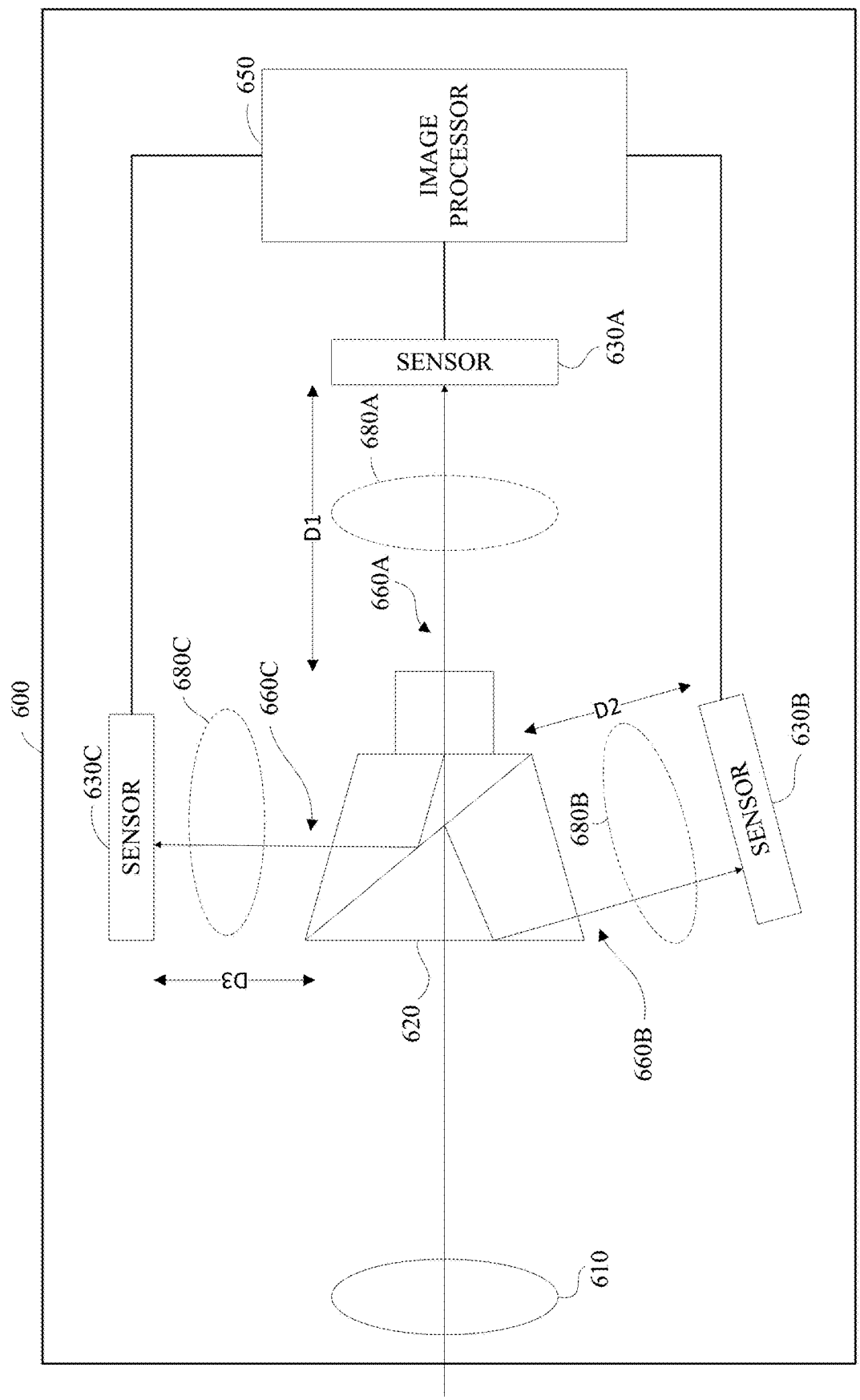
FIG. 6 is a diagram of another example of an image capture device in accordance with embodiments of this disclosure.

FIG. 6 is a diagram of another example of an image capture device 600 in accordance with embodiments of this disclosure. The image capture device 600 may be any device configured to capture photographic images, video, or both. For example, the image capture device 600 may include the image capture device 100 of FIGS. 1A-D or the image capture device 200 of FIGS. 2A-C. As shown in FIG. 6, the image capture device 600 includes an optical element 610, an optical device 620, a first sensor 630A, a second sensor 630B, a third sensor 630C, and an image processor 650.

The optical element 610 may be any type of lens or element that is configured to receive and direct light onto one or more image sensors, for example the first sensor 630A, the second sensor 630B, the third sensor 630C, or any combination thereof. The optical element 610 may have a standard field of view, a wide-angle field of view, a fisheye field of view, or any combination thereof. The optical element 610 may be configured with an aperture of any size. For example, the optical element 610 may have an aperture of F/2.0, F/2.8, or greater.

The optical device 620 is configured to receive an image via the optical element 610. The optical device 620 may be any type of device configured to direct light onto one or more image sensors. In some implementations, the optical device may be a beam splitter or a lenticular lens. As shown in FIG. 6, the optical device 620 is shown as a beam splitter that is configured to refract the received light and create a first ray path 660A, a second ray path 660B, and a third ray path 660C directed to the first sensor 630A, the second sensor 630B, and the third sensor 630C, respectively.

The first sensor 630A may be a Bayer sensor, a monochromatic sensor, or any other type of image sensor. The second sensor 630B may be a Bayer sensor, a monochromatic sensor, or any other type of image sensor. The third sensor 630C may be a Bayer sensor, a monochromatic sensor, or any other type of image sensor. The type of sensors may be varied based on lighting conditions. In some examples, up to a 6 dB SNR improvement may be achieved in low light image quality when compared to a single sensor image capture device. In an example where two or more of the first sensor 630A, the second sensor 630B, and the third sensor 630C are Bayer sensors, the amount of light required for image capture may be decreased by a factor of two or more. In an example where the first sensor 630A or the second sensor 630B is a Bayer sensor and the third sensor 630C is a monochromatic sensor, the amount of light required for image capture may be decreased by a factor of 3 or more.

As shown in FIG. 6, the first sensor 630A is configured to receive the image via the first ray path 660A, the second sensor 630B is configured to receive the image via the second ray path 660B, and the third sensor 630C is configured to receive the image via the third ray path 660C. The first sensor 630A, the second sensor 630B, and the third sensor 630C may be configured at any angle relative to the optical device 620 based on desired depths of field, constraints of the optical device 620, image capture device 600 configuration, or any combination thereof.

The depth of field of the first sensor 630A is based on the first ray path 660A. The first ray path 660A has an optical path length that may be configured by adjusting the distance D1 between the first sensor 630A and the optical device 620. Accordingly, the depth of field of the first sensor 630A may be configured by increasing or decreasing the optical path length of the first ray path 660A. The depth of field of the second sensor 630B is based on the second ray path 660B. The second ray path 660B has an optical path length that may be configured by adjusting the distance D2 between the second sensor 630B and the optical device 620. Accordingly, the depth of field of the second sensor 630B may be configured by increasing or decreasing the optical path length of the second ray path 660B. The depth of field of the third sensor 630C is based on the third ray path 660C. The third ray path 660C has an optical path length that may be configured by adjusting the distance D3 between the third sensor 630C and the optical device 620. Accordingly, the depth of field of the third sensor 630C may be configured by increasing or decreasing the optical path length of the third ray path 660C. The depth of field of the first sensor 630 may overlap with one or more of the depth of fields of the second sensor 630B and the third sensor 630C. The distance D1, the distance D2, the distance D3, or any combination thereof, may each be adjusted to achieve any desired depth of field. In some embodiments, the optical path length of the first ray path 660A may be greater than the optical path length of the second ray path 660B, the optical path length of the third ray path 660C, or both. In some embodiments, the optical path length of the second ray path 660B may be greater than the optical path length of the first ray path 660A, the optical path length of the third ray path 660C, or both. In some embodiments, the optical path length of the first ray path 660A, the optical path length of the second ray path 660B, and the optical path length of the third ray path 660C may all be different.

The image processor 650 is configured to receive the image from the first sensor 630A, the second sensor 630B, and the third sensor 630C. The image processor 650 is configured to combine the image from the first sensor 630A, the image from the second sensor 630B, and the image from the third sensor 630C to obtain a focused image. The focused image has an extended depth of field that is based on the first optical path length, the second optical path length, and the third optical path length. In an example where the first sensor 630A has a depth of field that is from about 0.6 m to infinity (i.e., greater than 10 m), the second sensor 630B has a depth of field that is from about 0.4 m to about 1.0 m, and the third sensor 630C has a depth of field that is from about 0.1. to about 0.5 m, the extended depth of field is from about 0.1 m to infinity.

The image capture device 600 shown in FIG. 6 may include one or more optical elements between the optical device 620 and the first sensor 630A, one or more optical elements between the optical device 620 and the second sensor 630B, one or more optical elements between the optical device 620 and the third sensor 630C, or any combination thereof. The example shown in FIG. 6 includes an optical element 680A in the first ray path 660A between the optical device 620 and the first sensor 630A. The optical element 680A may be any type of lens or element that is configured to receive and direct light onto the first sensor 630A. The optical element 680A may be positioned at any point between the optical device 620 and the first sensor 630A. The optical element 680 may be configured to adjust any optical property, for example field of view, zoom, or lens F number (F/#). The example shown in FIG. 6 may also include an optical element 680B in the second ray path 660B between the optical device 620 and the second sensor 630B. The optical element 680B may be any type of lens or element that is configured to receive and direct light onto the second sensor 630B. The optical element 680B may be positioned at any point between the optical device 620 and the second sensor 630B. The optical element 680B may be configured to adjust any optical property, for example field of view, zoom, or lens F/#. The example shown in FIG. 6 may also include an optical element 680C in the third ray path 660C between the optical device 620 and the third sensor 630C. The optical element 680C may be any type of lens or element that is configured to receive and direct light onto the third sensor 630C. The optical element 680C may be positioned at any point between the optical device 620 and the third sensor 630C. The optical element 680C may be configured to adjust any optical property, for example field of view, zoom, or lens F/#.

Figure 7:
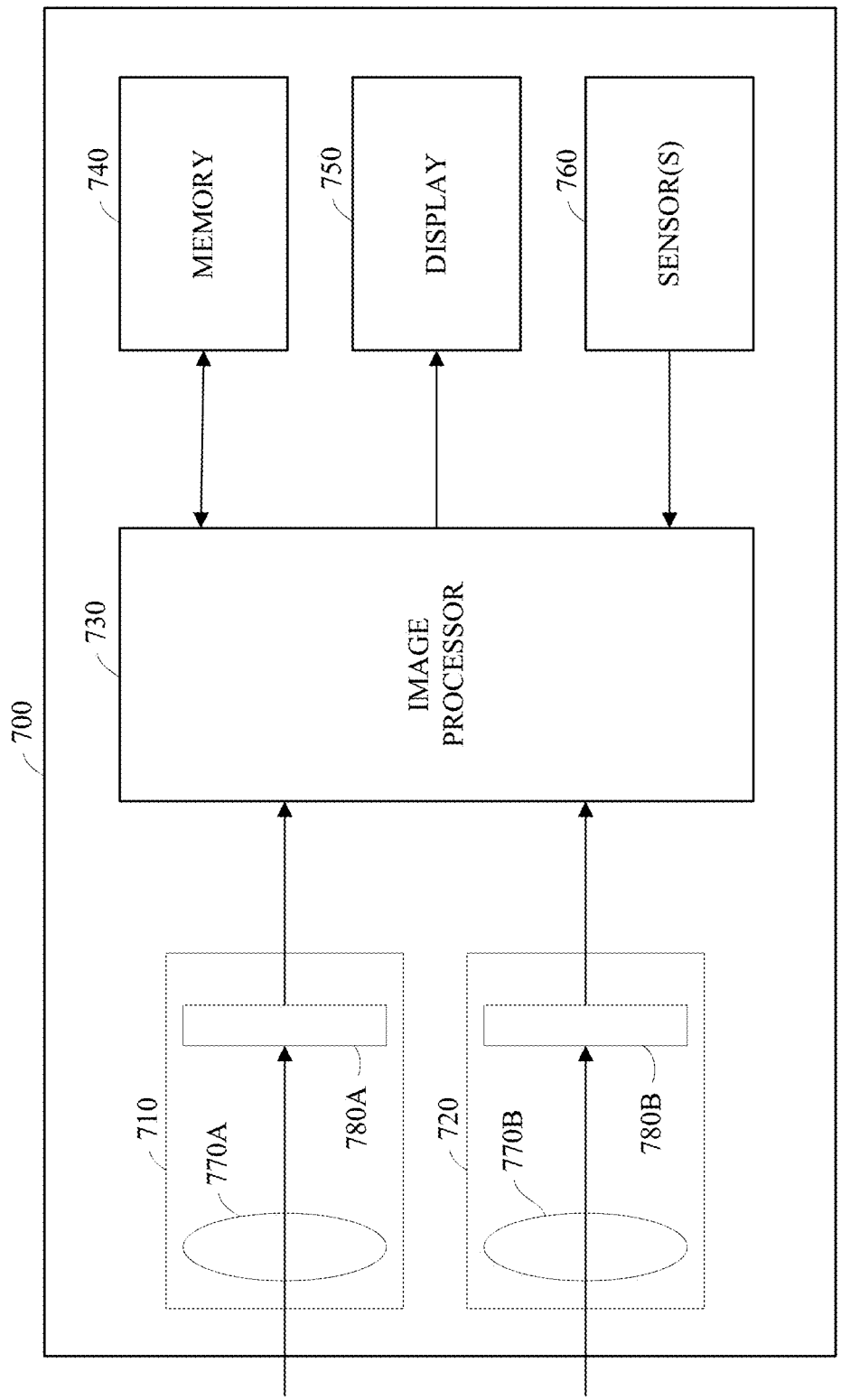
FIG. 7 is a diagram of another example of an image capture device in accordance with embodiments of this disclosure.

FIG. 7 is a diagram of another example of an image capture device 700 in accordance with embodiments of this disclosure. The image capture device 700 may be any device configured to capture photographic images, video, or both. For example, the image capture device 700 may include the image capture device 100 of FIGS. 1A-D or the image capture device 200 of FIGS. 2A-C. As shown in FIG. 7, the image capture device 700 includes a first integrated sensor lens assembly (ISLA) 710, a second ISLA 720, an image processor 730, a memory 740, a display 750, and one or more sensors 760. As shown in FIG. 7, the optical element 770A and the optical element 770B may both be disposed on the same side of the image capture device 700 and face the same direction. The optical element 770A and the optical element 770B may be arranged in a stacked configuration or arranged in a side-by-side configuration.

The first ISLA 710 includes an optical element 770A and a sensor 780A. The optical element 770A may be a lens or a group of lenses. The optical element 770A of the first ISLA 710 may be disposed on an internal surface of a housing of the image capture device 700 such that it is exposed to an external surface of the image capture device 700 and configured to directly capture light external to the image capture device 700. The optical element 770A may be any type of lens or element that is configured to receive and direct light onto one or more image sensors, for example the sensor 780A. The optical element 770A may have a standard field of view, a wide-angle field of view, a fisheye field of view, or any combination thereof. The optical element 770A may be configured with an aperture of any size. For example, the optical element 770A may have an aperture of F/2.0, F/2.8, or greater.

The second ISLA 720 includes an optical element 770B and a sensor 780B. The optical element 770B may be a lens or a group of lenses. The optical element 770B of the first ISLA 720 may be disposed on an internal surface of the housing of the image capture device 700 such that it is exposed to an external surface of the image capture device 700 and configured to directly capture light external to the image capture device 700. The optical element 770B may be any type of lens or element that is configured to receive and direct light onto one or more image sensors, for example the sensor 780B. The optical element 770B may have a standard field of view, a wide-angle field of view, a fisheye field of view, or any combination thereof. The optical element 770B may be configured with an aperture of any size. For example, the optical element 770B may have an aperture of F/2.0, F/2.8, or greater.

The sensor 780A may be a Bayer sensor, a monochromatic sensor, or any other type of image sensor. The sensor 780B may be a Bayer sensor, a monochromatic sensor, or any other type of image sensor. The type of sensors may be varied based on lighting conditions. In some examples, up to a 6 dB signal-to-noise ratio (SNR) improvement may be achieved in low light image quality when compared to a single sensor image capture device. In an example where the sensor 780A is a Bayer sensor and the sensor 780B is a Bayer sensor, the amount of light required for image capture may be decreased by a factor of two. In an example where the sensor 780A is a Bayer sensor and the sensor 780B is a monochromatic sensor, the amount of light required for image capture may be decreased by a factor of 3.

As shown in FIG. 7, the first ISLA 710 is configured to receive the image via the first optical element 770A, and the second ISLA 720 is configured to receive the image via the second optical element 770B. Although two ISLAs are shown in FIG. 7 as an example, some embodiments include more than two ISLAs. The two optical elements 770A, 770B are both be disposed on the same side of the image capture device 700 and face the same direction. The optical elements 770A, 770B may be arranged in a stacked configuration or arranged in a side-by-side configuration.

The depth of field of the sensor 780A may be based on an aperture of the optical element 770A, a FOV of the optical element 770A, a distance between the optical element 770A and the sensor 780A, or any combination thereof. For example, the depth of field of the sensor 780A may be configured by increasing or decreasing the optical path length between the optical element 770A and the sensor 780A. In some embodiments, the depth of field may be based on a focal distance of the optical element 770A. The focal distance of the optical element 770A may be based on a positioning of one or more lenses. The depth of field of the sensor 780B may be based on an aperture of the optical element 770B, a FOV of the optical element 770B, a distance between the optical element 770B and the sensor 780B, or any combination thereof. For example, the depth of field of the sensor 780A may be configured by increasing or decreasing the optical path length between the optical element 770B and the sensor 780B. In some embodiments, the depth of field may be based on a focal distance of the optical element 770B. The focal distance of the optical element 770B may be based on a positioning of one or more lenses. The depth of field of the sensor 780A may overlap with the depth of field of the sensor 780B. In some embodiments, the optical element 770A and the optical element 770B may be of the same type, have the same aperture, have the same FOV, or any combination thereof. In some embodiments, the sensor 780A and the senor 780B may be of the same type, have the same optical path length, or both.

The image processor 730 is configured to receive the image from the first ISLA 710 via the sensor 780A, and receive the image from the second ISLA 720 via the sensor 780B. The image processor 730 is configured to combine the image from the first ISLA 710 and the image from the second ISLA 720 to obtain a focused image. The focused image has an extended depth of field that is based on the optical path length of sensor 780A and the optical path length of sensor 780B. In an example where the sensor 780A has a depth of field that is from about 0.6 m to infinity (i.e., greater than 10 m), and the sensor 780B has a depth of field that is from about 0.4 m to about 1.0 m, the extended depth of field is from about 0.4 m to infinity.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a first optical element;
   an optical device configured to receive an image via the first optical element and direct the image to a first sensor and a second sensor;
   the first sensor of a first type configured to receive the image from the optical device via a first ray path having a first optical path length, wherein the first sensor has a depth of field from about 0.6 m to infinity;
   a second optical element disposed between the optical device and the first sensor, wherein the second optical element is a lens that has a first field of view;
   the second sensor of a second type, wherein the second type is different than the first type, the second sensor configured to receive the image from the optical device via a second ray path having a second optical path length, wherein the second sensor has a depth of field from about 0.4 m to about 1.0 m;
   a third optical element disposed between the optical device and the second sensor, wherein the third optical element is a lens that has a second field of view, wherein the second field of view is different than the first field of view; and
   an image processor electrically coupled to the first sensor and the second sensor, the image processor configured to obtain a focused image in a low light condition, wherein the focused image has an extended depth of field based on the first optical path length and the second optical path length, wherein the extended depth of field is about 0.4 m to infinity.

2. The image capture device of claim 1, wherein a first depth of field is based on the first optical path length and a second depth of field is based on the second optical path length.

3. The image capture device of claim 1 further comprising:
   a third sensor configured to receive the image from the optical device via a third ray path having a third optical path length, wherein the extended depth of field is based on the first optical path length, the second optical path length, and the third optical path length.

4. The image capture device of claim 3, wherein a first depth of field is based on the first optical path length, a second depth of field is based on the second optical path length, and a third depth of field is based on the third optical path length.

5. The image capture device of claim 1, wherein the optical device is a beam splitter.

6. The image capture device of claim 1, wherein the optical device is a lenticular lens.

7. The image capture device of claim 1, wherein the first optical element has an aperture of F/2.8 or F/2.0.

8. An image capture device comprising:
   a first optical element;
   a first sensor of a first type configured to receive an image from the first optical element via a first ray path having a first optical path length, wherein the first sensor has a depth of field from about 0.6 m to infinity;
   a second optical element disposed between the first optical element and the first sensor, wherein the second optical element is a wide-angle lens;
   a second sensor of a second type, wherein the second type is different than the first type, the second sensor configured to receive the image from the first optical element via a second ray path having a second optical path length, wherein the second sensor has a depth of field from about 0.4 m to about 1.0 m;
   a third optical element disposed between the first optical element and the second sensor, wherein the third optical element is a standard angle lens; and
   an image processor electrically coupled to the first sensor and the second sensor, the image processor configured to obtain a focused image in a low light condition, wherein the focused image has an extended depth of field based on the first optical path length and the second optical path length, wherein the extended depth of field is about 0.4 m to infinity.

9. The image capture device of claim 8, wherein the first sensor and the second sensor have an aligned optical axis.

10. The image capture device of claim 8, wherein a first depth of field is based on the first optical path length and a second depth of field is based on the second optical path length.

11. The image capture device of claim 8, wherein the second optical path length is shorter than the first optical path length.

12. The image capture device of claim 8, wherein the first sensor is a Bayer sensor and the second sensor is a monochromatic sensor.

13. The image capture device of claim 8, wherein the first optical element is a beam splitter or a lenticular lens.

14. An image capture device comprising:
   a first optical element configured to direct an image to a first sensor and a second sensor;
   an optical device configured to receive an image via the first optical element;
   the first sensor of a first type configured to receive the image from the optical device via a first ray path having a first optical path length, wherein the first sensor has a depth of field from about 0.6 m to infinity;
   a second optical element disposed between the optical device and the first sensor, wherein the second optical element is a fixed-zoom lens;
   a second sensor of a second type, wherein the second type is different than the first type, the second sensor configured to receive the image from the optical device via a second ray path having a second optical path length, wherein the second sensor has a depth of field from about 0.4 m to about 1.0 m;
   a third optical element disposed between the first optical element and the second sensor, wherein the third optical element is a wide-angle lens; and
   an image processor electrically coupled to the first sensor and the second sensor, the image processor configured to obtain a focused image in a low light condition, wherein the focused image has an extended depth of field based on the first optical path length and the second optical path length, wherein the extended depth of field is about 0.4 m to infinity.

15. The image capture device of claim 14, wherein a first depth of field is based on the first optical path length and a second depth of field is based on the second optical path length.

16. The image capture device of claim 14 further comprising:
   a third sensor configured to receive the image from the optical device via a third ray path having a third optical path length, wherein the extended depth of field is based on the first optical path length, the second optical path length, and the third optical path length.

17. The image capture device of claim 16, wherein a first depth of field is based on the first optical path length, a second depth of field is based on the second optical path length, and a third depth of field is based on the third optical path length.

18. The image capture device of claim 14, wherein the optical device is a beam splitter or a lenticular lens.

19. The image capture device of claim 14 further comprising:
   a fourth optical element disposed between the optical device and the second sensor, wherein the fourth optical element is configured to adjust a field of view, a zoom length, or an aperture property.

20. The image capture device of claim 14, wherein the first optical element has an aperture of F/2.8 or F/2.0.

* * * * *